Dec. 17, 1940.   J. R. LAPHAM ET AL   2,225,501
MACHINE FOR WASHING CREAM SEPARATOR DISKS
Filed June 4, 1938   3 Sheets-Sheet 3
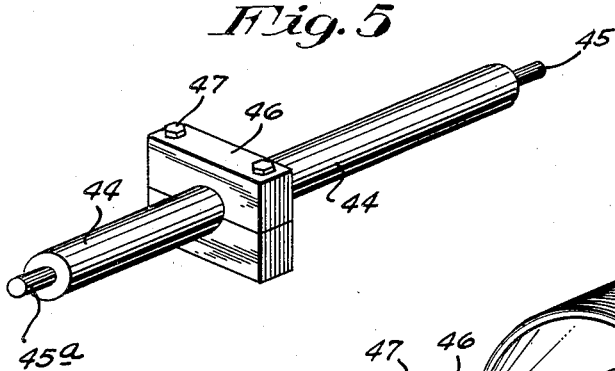
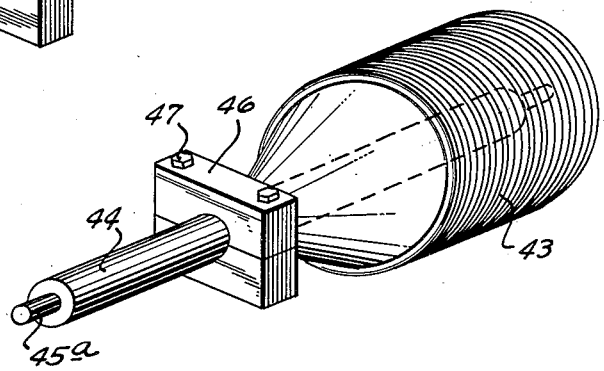
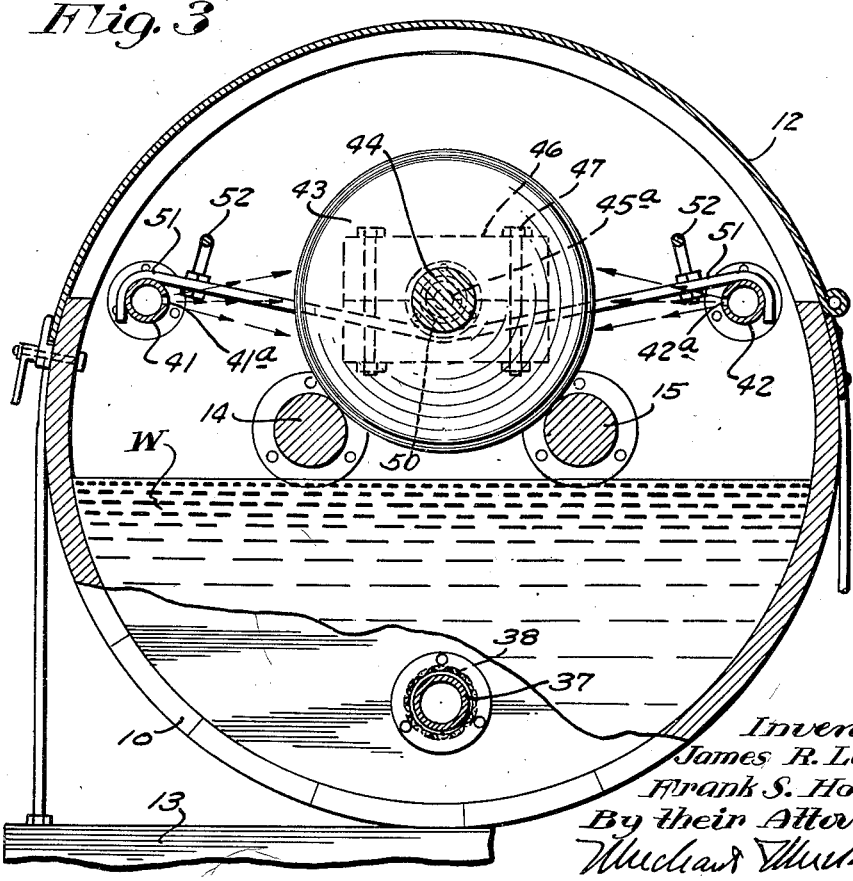
Inventors
James R. Lapham
Frank S. Holida
By their Attorneys Patented Dec. 17, 1940

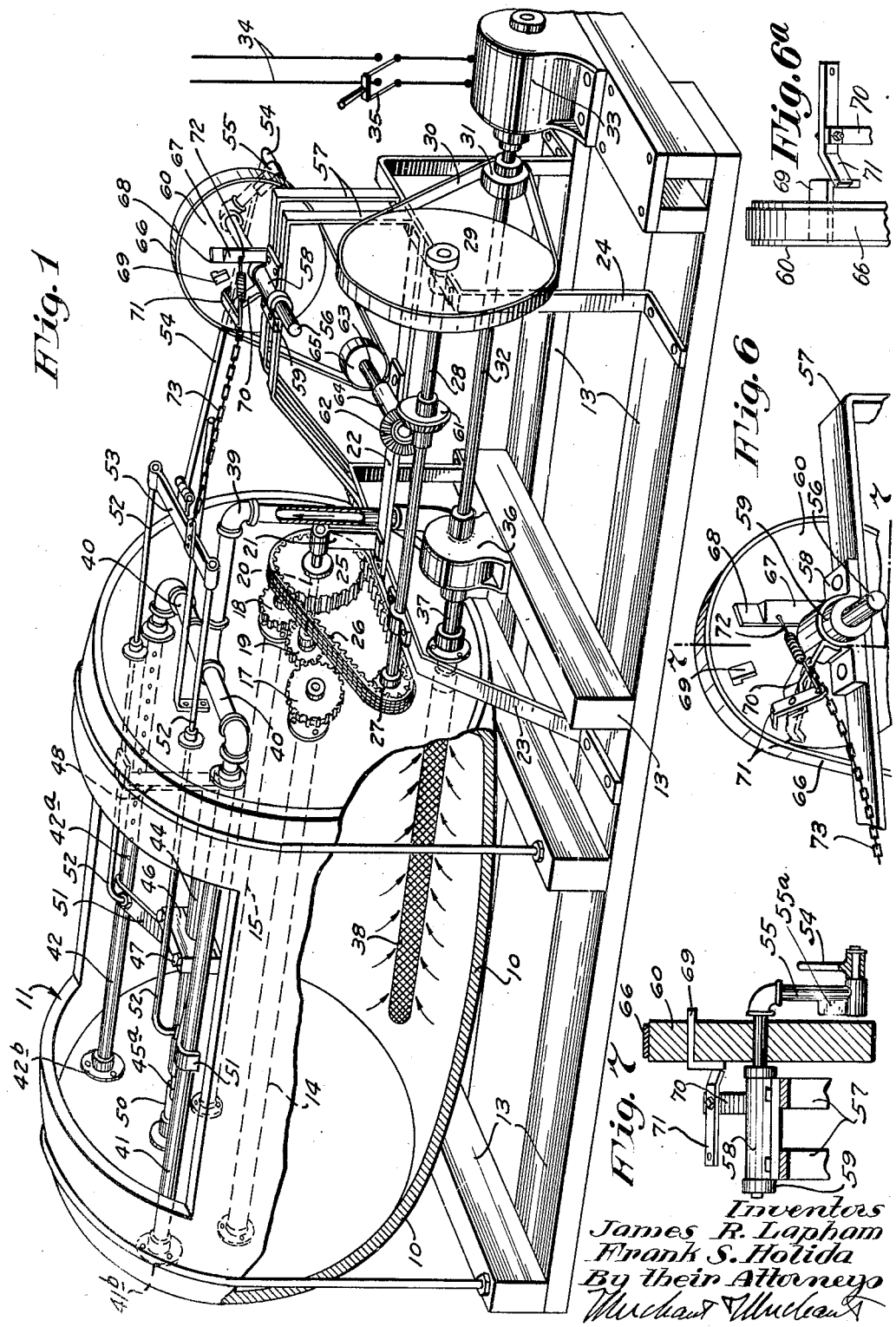

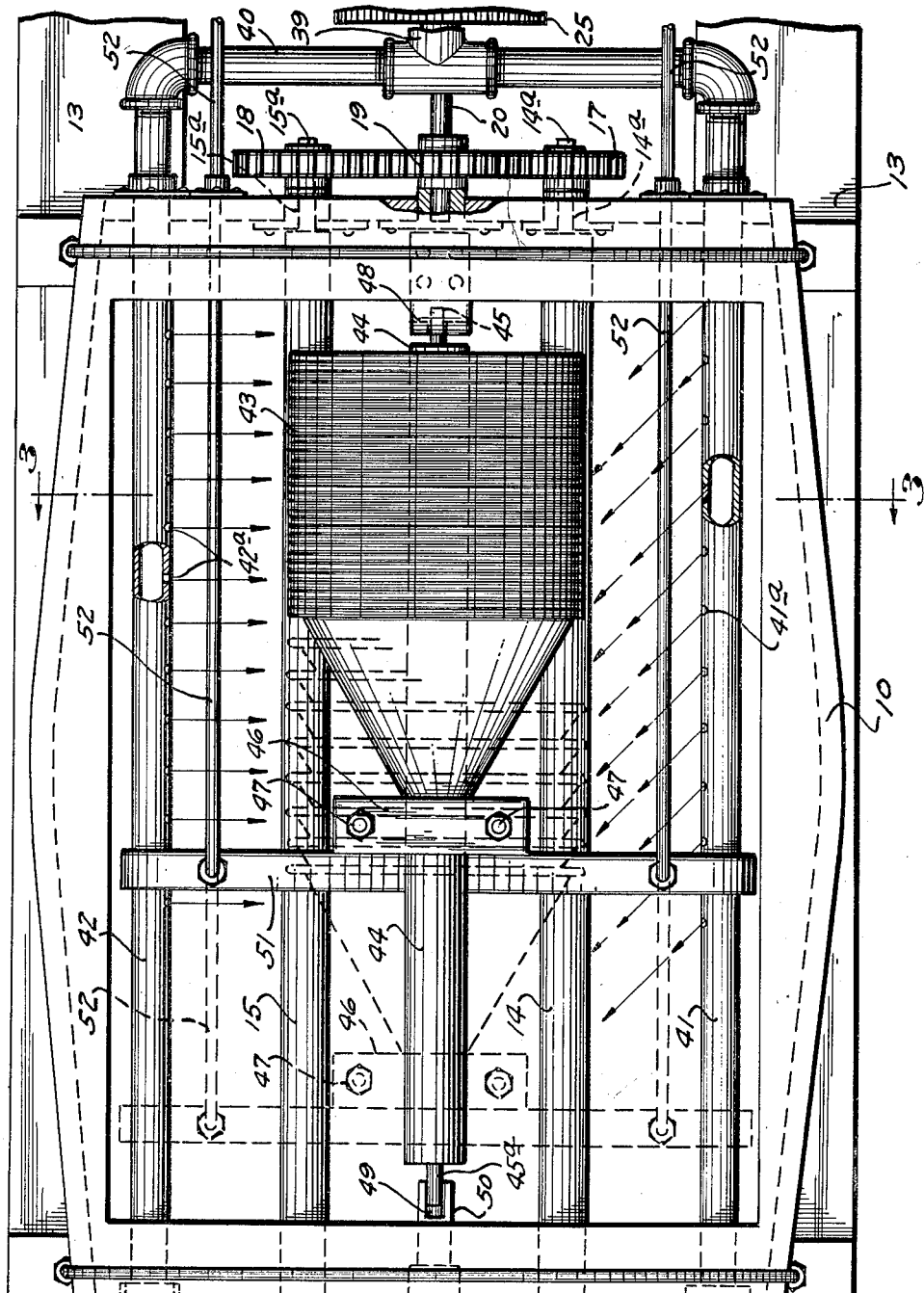

2,225,501

UNITED STATES PATENT OFFICE 2,225,501

MACHINE FOR WASHING CREAM SEPARATOR DISKS

James R. Lapham and Frank S. Holida, Minneapolis, Minn.

Application June 4, 1938, Serial No. 211,831

9 Claims. (Cl. 141—1)

This invention provides a highly efficient machine for washing cream separator disks. As is well known, cream separator disks are thin sheet metal shells of conical form, formed with axial passages adapting them to be assembled on the rotary spindles of cream separators. In the use of these disks in cream separators, the slime and dirt and other material accumulates on the disks requiring the disks to be frequently cleaned. The slime and dirt especially adheres to the disks with great tenacity, making cleaning thereof, under the old method, a very difficult matter.

The machine herein disclosed and claimed is a commercially successful operating machine especially designed for the purpose of cleaning these cream separator disks, but it will be understood that the machine may be employed for the cleaning of various other like articles.

In the description of the machine illustrated in the drawings, it will be treated as designed and used for the cleaning of cream separator disks.

In the use of this improved machine, the conical disks are nested together and placed on a mandrel in compact form. The mandrel with the disks applied is placed in a washing tank and the rims of the disks are placed upon a bearing of differentially driven supporting rollers by the differential rotation of which the several disks are not rotated bodily as a group, but the individual disks are given differential rotary movements which initially separate or loosen the one with respect to the other. By the action of streams of water, usually containing a cleaning solution or solvent such as an alkali or washing powder, the disks are caused not only to move bodily as a group, but to separate so that the water will be dashed not only on the exterior but also on the interior thereof. As the disks are separated they will be caused to travel axially, and when they separate and travel to a certain extent and to a definite point, the retracting means operates thereon to force the same back to a starting point or an initial place of compact assembly. These operations are continued until the disks have been completely cleaned.

Starting and stopping of the action of the machine may be accomplished in any suitable way, but preferably by closing and opening the circuit to an electric motor that affords power for the operation of the machine including a pump for circulating the water under high pressure.

The machine above referred to and generally outlined is illustrated in the accompanying drawings wherein like characters indicate like parts throughout the several views.

Referring to the drawings:

Fig. 1 is a perspective with some parts broken away showing the complete machine;

Fig. 2 is a plan view of the machine with some parts broken away and some parts removed;

Fig. 3 is a transverse section taken on the line 3—3 of Fig. 2;

Fig. 4 is a perspective showing the group or gang of separating disks applied on a supporting mandrel;

Fig. 5 is a perspective of the mandrel with the disks removed therefrom;

Fig. 6 is a perspective showing the driving sprocket and one-way clutch mechanism for connecting the same to the so-called retracting crank;

Fig. 7 is a section taken on the line 7—7 of Fig. 6; and

Fig. 6a is a detail view in elevation of a part of the tripping mechanism shown at the upper right hand portion of Fig. 1.

The cleaning operation is performed in a suitable receptacle which preferably is a horizontally disposed drum 10 of barrel-like form, and as shown, is provided at its top with a large opening 11 adapted to be closed by a hinged cover 12, which latter is shown only in Fig. 3. This drum 10 is rigidly anchored on a supporting base structure 13, which in some instances, might be the permanent floor of a building, but is preferably a portable structure on which all of the parts of the complete machine are mounted as a completely assembled unit.

This receptacle 10 is adapted to contain water W containing the suitable solvent or cleaning solution such as indicated, up to approximately the level indicated in Fig. 3. Extended longitudinally of and within the drum, preferably above the water level, is a pair of parallel rollers 14 and 15 that are journalled in suitable bearings on the heads of the drum, and have shafts 14a and 15a equipped with spur gears 17 and 18 respectively. The gears 17 and 18 differ in the number of their teeth and pitched diameters, but both thereof engage with an intermediate gear 19 of the shaft 20 that is journalled in a bearing on the adjacent head of the drum and in any other suitable support such as bracket 21 projected upward from the cross bar 22 of a pair of strap-like main brackets 23 and 24 that are anchored to the base 13.

The shaft 20 is connected to a pulley 25 of the silent chain type. Belt 26 runs over sprocket 25 and over a similar sprocket 27. The end counter shaft 28 is journalled in suitable bearings on the brackets 23 and 24 and is provided at its extended end with a large pulley 29. A belt 30 runs over pulley 29 and over pulley 31 that is secured to the extended rotary shaft 32 of an electric motor 33, the frame of which is anchored on the base frame 13.

Through the driving mechanism just described, the rollers 14 and 15 will be driven from the electric motor at a very low speed as compared with that of the motor shaft 32. In Fig. 1 the motor 33 is indicated as receiving current from supply leads 34 through the master switch 35.

The speeds of the various parts may be changed, but with the arrangement shown in the drawings, these speeds may be assumed to be seventeen hundred (1700) revolutions per minute for the motor, seventy-five (75) revolutions per minute of roller 14 and one hundred (100) revolutions per minute of roller 15.

The circulation of the water to and from the drum is preferably through a rotary pump, the casing of which is fixed on the base 13, and the rotor of which is connected to the extended shaft 32 of the electric motor 33 so that the speed of the rotor of said pump, in the arrangement noted, would be that of the rotor of the motor, to wit, approximately seventeen hundred revolutions per minute.

The intake of this pump 36 is connected to a pipe 37 that is extended into the drum and therein is provided with a long perforated stringer-like intake section 38. From the outlet of the pump 36 is extended a delivery pipe 39 which by a branch pipe 40 is connected to the outer ends of nozzle pipes 41 and 42. These pipes 41 and 42 extend through one head of the drum, and within the drum are in parallel relation near the top of the drum. At their extended ends said pipes 41 and 42 are closed by caps 41b and 42b that are rigidly secured to the adjacent drum head so that the two pipes 41 and 42 are rigidly supported from both drum heads and hence adapted to afford a support for a sliding retractor bar hereinafter to be described. The pipe 41 is provided with oblique perforations or nozzle-acting discharge ports 41a, while nozzle-pipe 42 is provided with perforations or nozzle-acting discharge ports 42a that are preferably perpendicular to the axis of the said pipe. As will more fully appear, in the description of the operation, the perforations 42a will discharge water sprays against the separator disks perpendicular to the common axis thereof, while the oblique perforations 41a will discharge sprays on to the disks at an angle of about 45° or at an angle closely approximating the conical surfaces of the disks.

The separator disks 43 in a nested group are telescoped on to a supporting mandrel 44 which, as shown, has reduced trunnion-like ends 45 and 45a. Mounted on the mandrel 44 adjacent the conical end of the foremost disk, is a frictionally held or slidable collar 46 shown as made up of two sections connected by machine screws 47. This collar 46 is a slide collar that can be moved or slid on the mandrel 44 under very light pressure so as to permit spreading of the disks on the mandrel under the action of the oblique sprays, as will hereinafter more fully appear. The mandrel and parts thereon are adapted to be easily and quickly applied in the washer or to be removed therefrom.

In the arrangement illustrated, the trunnion 45 is adapted to be inserted end-wise through a perforation in a supporting bracket 48, see particularly Fig. 2, and rigidly secured to the top of one end of the drum and appending therefrom; while the trunnion 45a is adapted to be dropped downward into a groove 49 formed in a hub-like bearing 50 that is rigidly secured to the adjacent head of the drum.

For operation on the collar 46 to intermittently restore the same to initial position on the mandrel, I have provided automatically retracting means which, in the arrangement illustrated, includes as an element a retractor bar 51, the bent ends of which rest and slide upon the two pipes 41 and 42 with the intermediate portion of said bar underlying the mandrel 44 and engageable with the slip collar 46. The ends of the retractor bar 51 are connected to the inner ends of pull rods 52, that work through one head of the drum, to wit, as shown through the right-hand head thereof, as shown in Fig. 1, with their outer ends connected to a cross bar 53. The intermediate portion of this cross bar 53 is connected by a rod-like link 54 to the wrist pin of a crank arm 55 of a crank shaft 56 which, in the structure illustrated, is rigidly secured to strap-like supporting brackets 57, superimposed on and rigidly secured to the tops of the brackets 23 and 24. As shown, said crank shaft is loosely journalled in a bearing 58 on said brackets 57. At one side of the bearing 58 shaft 56 has a stop collar 59, and on the other side of said crank shaft, close to the inner side of the crank 55, is a normally loose pulley 60.

The pulley 60 is driven from shaft 28 and hence from the motor through reducing drive mechanism which, as shown, is as follows:

A bevel gear 61 on shaft 28 engages the bevel gear 62 on a short transverse countershaft 63 journalled in the bearing 64 on the bracket frame 22 and is provided at its extended end with a small pulley 65 over which and the relatively large loose pulley 60 runs a driving belt 66.

Rigidly secured, preferably and as shown, to the fixed bearing 58 is an upstanding post 67 which at its upper end has an oblique cam blade 68 that operates as presently noted.

Carried by the loose pulley 60 and mounted for transverse sliding movements therethrough, is a crank pick-up dog or lug 69. This so-called dog 69 is an L-shaped structure with a depending end adjacent the cam blade 68. The inner edge of cam blade 68 works very close to the adjacent face of loose pulley 60, and when said pulley is rotated in a counter-clockwise direction in respect to Fig. 6, will engage the depending end of dog 69 and cam the depending end thereof away from the face of the pulley.

Mounted on a fixed arm or bracket 70, which, as shown, projects from the bearing 58, and intermediately pivoted thereto, is a dog actuating trip lever 71, the upper end of which is bent laterally, as best shown in Fig. 6 and also in Fig. 7. The inner end of the trip lever 71 is connected to the fixed post 67 by a yielding or spring actuating link 72, and the same end of said trip lever is connected to the cross bar 53 of the retracting means by a flexible or one-way acting connection such as a chain 73. The bent end of the trip lever 71 is so beveled or inclined at an angle to the plane of the pulley 60 so as to cam the dog 69 into the position shown in Fig. 7.

By reference to Fig. 7 it will be noted that the crank 55 has a tappet surface or part 55a that will be engaged with pick-up dog 69 when the latter is adjusted to the right as shown in Fig. 7, and thereby cause the crank to be rotated with the pulley until released from said dog.

*Operation*

The assembled or nested disks are placed on the mandrel and the mandrel is placed in the machine, as best shown in Fig. 2. The depending bracket 48 will limit the extreme movement of the group of disks toward the right in respect to Fig. 2. When the machine is started in action by closing of the motor circuit switch 35, all of the running parts of the machine including the pump will be started into action. The rims of the disks will rest upon and be supported by the rotating rollers 14 and 15, and the gang or group of disks will be bodily rotated and at the same time will be subjected to the sprays of water from the pipes 41 and 42. The rims of the disks will, as they are rotated, be subjected to the differential driving actions of the two rollers 14 and 15, and during such rotations the adjacent disk at certain times will have greater tractional contact with the one roller than with the other, and at such times the disk that has the greatest frictional contact with roller 15 will be rotated slightly faster than the adjacent disk which happens to have a greater frictional contact with the more slowly driven roller 14. This differential rotating action breaks the frictional or adhesive contact between the disks making it an easy matter to separate the disks. The obliquely delivered sprays of water have an impelling action on the disks tending to separate and drift the same toward the left in respect to Fig. 2, and at the same time to move the entire group of disks bodily toward the left. This impelling action causes the slip collar 46 to move on the mandrel 44 toward the left, and the disk acting on the retracting member 51 causes the rods 52 to pull cross bar 53 in the same direction until the chain or flexible connection 73 has been pulled taut. When strain is put on the chain 73 in the direction stated, it moves the trip lever 71 against the tension of spring link 72, into a position in which the bent end of said lever will engage the depending end of pick-up dog 69 and move the same into the position shown in Fig. 7. When dog 69 is thus set in the constantly driven loose pulley 60, the projecting end of said dog will be in the path of movement of and will engage the tappet surface 55a of crank 55 thereby causing the said pulley to pick up the crank and give the same one rotation. The first one-half rotation of the crank 55 acting through the above noted elements 54, 52 and 51, moves the slip collar 46, toward the right, in respect to Fig. 2, back to its normal or starting position, and this, as evident, reassembles the disks in closely assembled positions.

When the crank has completed its revolution and has reset the disks as stated, the depending end of dog 69 engages the cam blade 68 of post 67 and is pulled out so that its projecting end will then clear the tappet 55a of the crank and set the crank back into its normal position. In Fig. 1 the crank is shown in a retracted position whereas its normal position will be about 180° in advance in a counter-clockwise position.

Under the first half rotation of the crank 55 from normal position into the position shown in Fig. 1, the retracting device 51, 52, 53 will be moved toward the right in respect to Fig. 1, and the disks will be collected in close formation; and under this movement, chain 73 will be given slack. Under the next half rotation of crank 55 back to normal position, the said retracting device will be moved toward the left so that the disks will be free under the action of the spray, directed as described, to separate; and under this action, chain 73 will be drawn taut and will then act as a stop to limit the said retracting movement of the retracting device.

When the pull on chain 73 is released and the chain is given slack, trip lever 71 will, under the action of the resilient link 72, be moved to normal position so that it will clear dog 69 and permit pulley 60 to continue to rotate without driving action until the clutch tripping action above described has been again produced by movement of the slip collar and other parts to extreme positions at the left in respect to Figs. 1 and 2.

It is important to note that the mandrel 44 is mounted within the drum or tank in such a way that while it is held against end-wise movement, it will allow the rims of the disks to rest on the differentially driven rollers 14 and 15 thereby affording the above noted required traction. As otherwise stated, the trunnions 45 of the mandrel are quite loosely mounted in the supports 48 and 50 and do not sustain the weight of the mandrel or of the disks.

The rotor of the pump 36 coupled directly to the motor shaft will be rotated at a high velocity and the water sprays will be discharged with great force from the spray pipes 41 and 42. The traveling movement of the slip collar 46 and retractor bar 51 and the spreading of the disks is caused chiefly by the obliquely delivered high pressure water sprays.

The time consumed in the movement of the slip collar and retractor bar from positions toward the right into extreme clutch tripping position toward the left may vary somewhat depending on the adhesion of the separator disks, but on the average will take about 1½ minutes.

As long as the machine is in action or as long as the pulley 60 is power rotated, the washing actions will be repeated over and over again, but the complete washing period will be terminated whenever the switch 35 is opened to cut off the power of the electric motor 33. Of course, the power of the motor might be otherwise cut off from the driving connections.

In practice it has been found that on the average the complete washing period will be completed in about 12 minutes; whereas, under the old method of washing the disks, a very much longer time and considerable hand work has been required to clean the disks.

In the above machine the differential driving actions of the disk supporting rollers is a highly important feature.

In actual practice the machine has been found highly efficient for the purposes had in view.

What we claim is:

1. In a machine of the kind described, means for rotating a gang of disks while permitting the lateral separation thereof, and means for spraying water on the disks and for causing separation thereof, in combination with means for restoring the disks to compact spacing after they have been separated to a certain extent.

2. In a machine of the kind described, means for rotating a group of closely assembled disks while permitting lateral separation thereof, and means for spraying water on the said disks while they are being rotated, said means including a spraying device arranged to discharge on to the disks sprays of water at an angle to the axis of the group of disks and in a direction to cause lateral separation thereof, and in combination with automatic means for reassembling the disks in compact form assembly after they have been laterally separated to a predetermined extent.

3. In a machine of the kind described, a water containing tank, laterally spaced power driven rollers extended in substantially parallel arrangement within said tank and adapted to support and rotate a gang of nested disks with freedom for lateral separation, and means for spraying water on to the disks while they are being rotated by said rollers and free for lateral separation, and in combination with a mandrel adapted to receive thereon a group of nested disks with said disks being directly mounted on said rollers and capable of lateral separation on said mandrel while they are being rotated.

4. In a machine of the kind described, means for rotating a gang of disks while permitting the lateral separation thereof, and means for spraying water on the disks and for causing separation thereof, and which spraying means includes laterally spaced spraying pipes, one of which has oblique discharge passages arranged to project sprays of water on to the disks at an angle to the axis of the group of disks and in a direction to cause separation of the disks.

5. In a machine of the kind described, means for rotating a group of closely assembled disks while permitting lateral separation thereof, and means for spraying water on the said disks while they are being rotated, said means including spraying devices arranged to discharge on to the disks sprays of water at an angle to the axis of the group of disks and in a direction to cause lateral separation thereof, and which spraying devices includes laterally spaced nozzle pipes, one of which has oblique water discharge passages arranged to project water sprays obliquely on to said disks and in a direction to cause separation thereof.

6. In a machine of the kind described, a water containing tank, laterally spaced power driven rollers extended in substantially parallel arrangement within said tank and adapted to support and rotate a gang of nested disks with freedom for lateral separation, and means for spraying water on to the disks which then are being rotated by said rollers and free for lateral separation, and which spraying devices include laterally spaced nozzle pipes, one of which has oblique water discharge passages arranged to project water sprays obliquely on to said disks and in a direction to cause separation thereof.

7. In a machine of the kind described, a water containing tank, laterally spaced power driven rollers extended in substantially parallel arrangement within said tank and adapted to support and rotate a gang of nested disks with freedom for lateral separation, and means for spraying water on to the disks which then are being rotated by said rollers and free for lateral separation, in further combination with a mandrel removably mounted in said tank and provided thereon with a group of nested disks seated on said rollers and capable of lateral separation, and retracting means including a driven pulley, a crank and one revolution clutch, a retracting bar connected to said crank and a clutch tripping device arranged to be operated when said retractor bar, under lateral separation of the disks, is moved to a predetermined place.

8. In a machine of the kind described, a water containing tank, laterally spaced power driven rollers extended in substantially parallel arrangement within said tank and adapted to support and rotate a gang of nested disks with freedom for lateral separation, and means for spraying water on to the disks which then are being rotated by said rollers and free for lateral separation, in further combination with a mandrel removably mounted in said tank and provided thereon with a group of nested disks seated on said rollers and capable of lateral separation, and retracting means including a driven pulley, a crank and one revolution clutch, a retracting bar connected to said crank and a clutch tripping device arranged to be operated when said retractor bar, under lateral separation of the disks, is moved to a predetermined place, said mandrel having a slip collar interposed between said retracting bar and the adjacent disks.

9. In a machine of the kind described, a water containing tank, laterally spaced power driven rollers extended in substantially parallel arrangement within said tank and adapted to support and rotate a gang of nested disks with freedom for lateral separation, and means for spraying water on to the disks which then are being rotated by said rollers and free for lateral separation, in further combination with means for the reassembling of the disks in nested formation after they have been separated to a predetermined extent.

JAMES R. LAPHAM.
FRANK S. HOLIDA.